US012137321B2

(12) United States Patent
Qiu et al.

(10) Patent No.: US 12,137,321 B2
(45) Date of Patent: Nov. 5, 2024

(54) METHOD FOR CONTROLLING SOUND BOX, SOUND BOX, AND NON-TRANSITORY COMPUTER READABLE STORAGE MEDIUM

(71) Applicant: GOERTEK INC., Weifang (CN)

(72) Inventors: Xiaoming Qiu, Weifang (CN); Weiguo Li, Weifang (CN)

(73) Assignee: GOERTEK INC., Weifang (CN)

( * ) Notice: Subject to any disclaimer, the term of this patent is extended or adjusted under 35 U.S.C. 154(b) by 92 days.

(21) Appl. No.: 17/477,252

(22) Filed: Sep. 16, 2021

(65) Prior Publication Data

US 2022/0007105 A1 Jan. 6, 2022

Related U.S. Application Data

(63) Continuation of application No. PCT/CN2019/129583, filed on Dec. 28, 2019.

(30) Foreign Application Priority Data

Dec. 20, 2019 (CN) ........................ 201911342017.4

(51) Int. Cl.
*H04R 1/40* (2006.01)
*H04R 1/02* (2006.01)
*H04R 5/04* (2006.01)

(52) U.S. Cl.
CPC ............... *H04R 1/403* (2013.01); *H04R 1/02* (2013.01); *H04R 5/04* (2013.01); *H04R 2420/05* (2013.01); *H04R 2420/07* (2013.01)

(58) Field of Classification Search
CPC . H04R 1/403; H04R 1/02; H04R 5/04; H04R 2420/05; H04R 2420/07

(Continued)

(56) References Cited

U.S. PATENT DOCUMENTS 10,089,066 B2 10/2018 Kang et al.
2010/0177909 A1* 7/2010 Aarts .................... H04R 1/403 381/92

(Continued)

FOREIGN PATENT DOCUMENTS

CN 101754082 A 6/2010
CN 104219603 A 12/2014

(Continued)

OTHER PUBLICATIONS

International Search Report and Written Opinion issued in corresponding International Application No. PCT/CN2019/129583; mailed Sep. 23, 2020; State Intellectual Property Office of the P.R. China, Beijing, China, 13 pgs.

(Continued)

*Primary Examiner* — Daniel R Sellers
(74) *Attorney, Agent, or Firm* — HAUPTMAN HAM, LLP

(57) ABSTRACT

Disclosed are a method for controlling a sound box, a sound box and a non-transitory computer readable storage medium. The method is applied to the sound box in a sound box system. The sound box system includes at least two sound boxes, each sound box includes at least two first sensors, the at least two first sensors are provided on opposite sides of the sound box, each first sensor is configured to transmit and receive preset signals, and the method includes following operations: obtaining, by the sound box, a connection status with other sound boxes; when the sound box is wirelessly connected to the other sound boxes, obtaining first sensing data detected by a first sensor; determining target channel information according to the first sensing data; and outputting audio according to the target channel information.

6 Claims, 12 Drawing Sheets

(58) Field of Classification Search
USPC .......................................................... 381/300
See application file for complete search history.

(56) References Cited

U.S. PATENT DOCUMENTS

| | | | | |
|---|---|---|---|---|
| 2014/0003619 | A1* | 1/2014 | Sannie | H04S 7/308<br>381/81 |
| 2015/0104037 | A1* | 4/2015 | Lee | H04S 7/308<br>381/80 |
| 2018/0165054 | A1 | 6/2018 | Kang et al. | |
| 2018/0192196 | A1* | 7/2018 | Gunnarsson | H04R 3/12 |
| 2019/0124462 | A1* | 4/2019 | Lindahl | H04S 7/301 |
| 2020/0084547 | A1* | 3/2020 | Yoshida | G01S 17/88 |

FOREIGN PATENT DOCUMENTS

| | | | |
|---|---|---|---|
| CN | 104967953 | A | 10/2015 |
| CN | 204741556 | U | 11/2015 |
| CN | 107736037 | A | 2/2018 |
| CN | 108882139 | A | 11/2018 |
| KR | 20140141370 | A | 12/2014 |

OTHER PUBLICATIONS

First Office Action issued in corresponding Chinese Application No. 201911342017.4; mailed Jul. 29, 2020; State Intellectual Property Office of the P.R. China, Beijing, China, 18 pgs.

Second Office Action issued in corresponding Chinese Application No. 201911342017.4; mailed Feb. 9, 2021; State Intellectual Property Office of the P.R. China, Beijing, China, 18 pgs.

Allowance issued in corresponding Chinese Application No. 201911342017.4; mailed May 8, 2021; State Intellectual Property Office of the P.R. China, Beijing, China, 5 pgs.

* cited by examiner

METHOD FOR CONTROLLING SOUND BOX, SOUND BOX, AND NON-TRANSITORY COMPUTER READABLE STORAGE MEDIUM

CROSS-REFERENCE TO RELATED APPLICATIONS

This application is a Continuation Application of International Application No. PCT/CN2019/129583, filed on Dec. 28, 2019, which claims priority to Chinese Patent Application No. 201911342017.4, filed on Dec. 20, 2019, the entire disclosures of which are incorporated herein by reference.

TECHNICAL FIELD

The present disclosure relates to the technical field of audio playback, in particular to a method for controlling a sound box, a sound box and a non-transitory computer readable storage medium.

BACKGROUND

In related art, in order to achieve stereo playback, multiple sound boxes are usually required to be used in combination. When multiple low-power sound boxes are used at the same time, since the relative positions of the sound boxes and the user often change, and in order to ensure that the multiple sound boxes can output audio according to the correct channel, when the user moves, the positions of the sound boxes need to be constantly adjusted to ensure the accuracy of the audio information output by the sound boxes. However, the user needs to constantly change the positions of the user and the sound boxes when using the sound boxes, which will cause the cumbersomeness of adjusting the positions of the sound boxes.

SUMMARY

The present disclosure provides a method for controlling a sound box, a sound box and a non-transitory computer readable storage medium, which aims to solve the problem in the related art that the sound box cannot be flexibly adjusted according to the current position of the user when the user moves.

In order to achieve the above objective, the present disclosure provides a method for controlling a sound box, applied to the sound box in a sound box system, wherein the sound box system includes at least two sound boxes, each sound box includes at least two first sensors, the at least two first sensors are provided on opposite sides of the sound box, each first sensor is configured to transmit and receive preset signals, and the method includes following operations:

- obtaining, by the sound box, a connection status with other sound boxes;
- when the sound box is wirelessly connected to the other sound boxes, obtaining first sensing data detected by a first sensor;
- determining target channel information according to the first sensing data; and
- outputting audio according to the target channel information.

In an embodiment, the operation of determining target channel information according to the first sensing data includes:

- obtaining a preset signal in the first sensing data;
- obtaining a target first sensor corresponding to the first sensing data from which the preset signal is extracted; and
- obtaining channel information corresponding to the target first sensor as the target channel information.

In an embodiment, the at least two first sensors are provided on left and right sides of the sound box, the operation of obtaining channel information corresponding to the target first sensor as the target channel information includes:

- when the target first sensor is located on the left side of the sound box, determining that the target channel information is right channel information;
- when the target first sensor is located on the right side of the sound box, determining that the target channel information is left channel information.

In an embodiment, the sound box further includes at least two second sensors, the at least two second sensors are provided on opposite sides of the sound box, each second sensor is located between the at least two first sensors, and each second sensor is configured to detect a human body signal, the operation of determining target channel information according to the first sensing data includes:

- obtaining second sensing data detected by a second sensor; and
- determining the target channel information according to the first sensing data and the second sensing data.

In an embodiment, the operation of determining the target channel information according to the first sensing data and the second sensing data includes:

- when the first sensor corresponding to the first sensing data is located on a left side of the sound box, and the second sensor corresponding to the second sensing data is located on a front side of the sound box, determining that the target channel information is right channel information;
- when the first sensor corresponding to the first sensing data is located on the left side of the sound box, and the second sensor corresponding to the second sensing data is located on a rear side of the sound box, determining that the target channel information is left channel information;
- when the first sensor corresponding to the first sensing data is located on a right side of the sound box, and the second sensor corresponding to the second sensing data is located on the front side of the sound box, determining that the target channel information is left channel information;
- when the first sensor corresponding to the first sensing data is located on the right side of the sound box, and the second sensor corresponding to the second sensing data is located on the rear side of the sound box, determining that the target channel information is right channel information.

In an embodiment, the sound box includes a contact and an interface, after the operation of obtaining, by the sound box, a connection status with other sound boxes, the method further includes:

- obtaining a connection mode of the sound box and the other sound boxes when the sound box is in contact connection with the other sound boxes;

determining the target channel information of the sound box according to the connection mode; and outputting the audio according to the target channel information.

In an embodiment, the operation of determining the target channel information of the sound box according to the connection mode includes:

when the sound box is connected to an interface of other sound boxes through the contact, determining that the target channel information is right channel information;

when the sound box is connected to a contact of other sound boxes through the interface, determining that the target channel information is left channel information.

In an embodiment, after the operation of obtaining a connection mode of the sound box and the other sound boxes when the sound box is in contact connection with the other sound boxes, the method further includes:

disconnecting a wireless communication connection between the sound box and the other sound boxes.

In order to achieve the above objective, the present disclosure provides a sound box, including: a memory, a processor, a computer program stored in the memory and executed by the processor, the computer program, when executed by the processor, implements the operations of the method for controlling the sound box as described above.

In order to achieve the above objective, the present disclosure provides a non-transitory computer readable storage medium, wherein a program for controlling a sound box is stored in the non-transitory computer readable storage medium, the program for controlling the sound box, when executed by a processor, implements the operations of the method for controlling the sound box as described above.

In technical solutions of the present disclosure, the method for controlling the sound box is applied to the sound box in the sound box system. The sound box system includes at least two sound boxes, each sound box includes at least two first sensors, the at least two first sensors are provided on opposite sides of the sound box, and each first sensor is configured to transmit and receive a preset signal. The method includes following operations: obtaining, by the sound box, a connection status with other sound boxes; when the sound box is wirelessly connected to the other sound boxes, obtaining first sensing data detected by the first sensor; determining target channel information according to the first sensing data; and outputting audio according to the target channel information. When the user moves relative to the combined sound box, the target channel information is determined through the sound box. Therefore, the audio is output through the target channel information, thereby solving the problem that the sound box cannot be flexibly adjusted according to the current position of the user when the user moves the position in the related art.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

Figure 1:
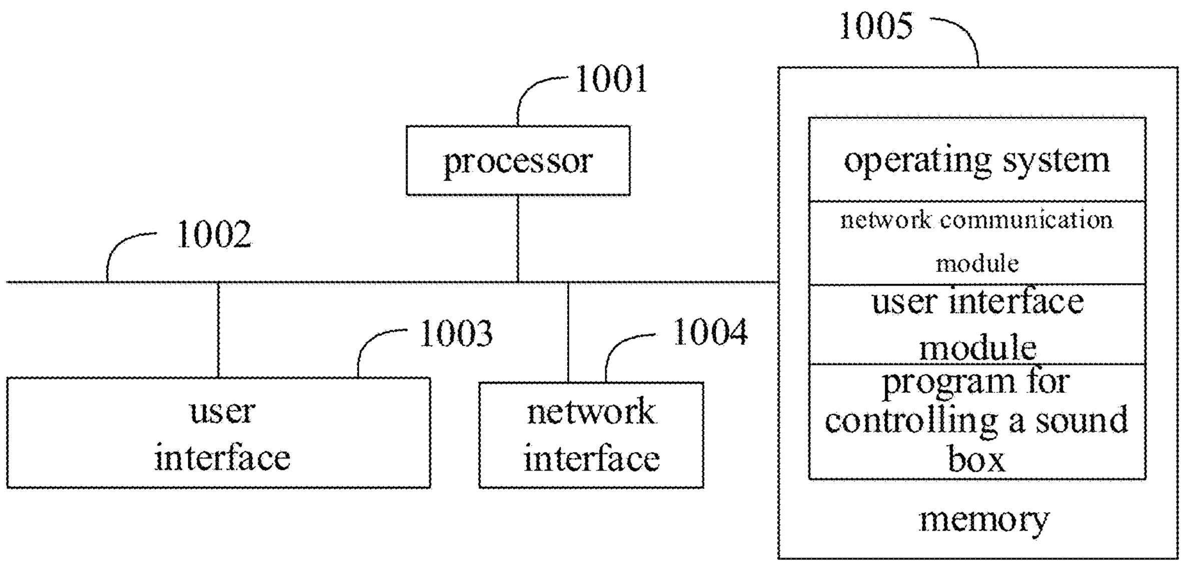
FIG. 1 is a schematic structural diagram of a terminal in a hardware operating environment according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In the description of the present disclosure, "plurality" means at least two, such as two, three, or the like, unless otherwise specifically defined.

In the present disclosure, unless otherwise clearly specified and limited, the terms "connected", "fixed", etc. should be interpreted broadly. For example, "fixed" can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those of ordinary skill in the art, the specific meaning of the above-mentioned terms in the present disclosure can be understood according to specific circumstances.

In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

As shown in FIG. 1, FIG. 1 is a schematic structural diagram of a terminal in a hardware operating environment according to an embodiment of the present disclosure.

The device according to an embodiment of the present disclosure can include a control device of a computer such as a server, a mobile terminal device, and a centralized controller.

As shown in FIG. 1, the device can include a processor 1001, such as a CPU, a network interface 1004, a user interface 1003, a memory 1005, and a communication bus 1002. The communication bus 1002 is configured to implement communication between the components. The user interface 1003 can include a display, an input unit such as a keyboard. The user interface 1003 can also include a standard wired interface and a wireless interface. The network interface 1004 can further include a standard wired interface and a wireless interface (such as a WI-FI interface). The memory 1005 can be a high-speed random access memory (RAM) or a non-volatile memory, such as a magnetic disk memory. The memory 1005 can also be a storage device independent of the foregoing processor 1001.

Those skilled in the art should understand that the structure of the terminal shown in FIG. 1 does not constitute a limitation on the terminal, and can include more or fewer components, a combination of some components, or differently arranged components than shown in the figure.

As shown in FIG. 1, the memory 1005, as a computer storage medium, can include an operating system, a network communication module, a user interface module, and a program for controlling a sound box.

In a server shown in FIG. 1, the user interface 1003 is mainly configured to display content of the device, and the processor 1001 can be configured to call the program for controlling the sound box stored in the memory 1005 and perform the following operations:

obtaining, by the sound box, a connection status with other sound boxes;

when the sound box is wirelessly connected to the other sound boxes, obtaining first sensing data detected by the first sensor;

determining target channel information according to the first sensing data; and outputting audio according to the target channel information.

Further, the processor 1001 can call the program for controlling the sound box stored in the memory 1005 and further perform the following operations:

obtaining a preset signal in the first sensing data;

obtaining a target first sensor corresponding to the first sensing data from which the preset signal is extracted; and obtaining channel information corresponding to the target first sensor as the target channel information.

Further, the processor 1001 can call the program for controlling the sound box stored in the memory 1005 and further perform the following operations:

when the target first sensor is located on the left side of the sound box, determining that the target channel information is right channel information;

when the target first sensor is located on the right side of the sound box, determining that the target channel information is left channel information.

Further, the processor 1001 can call the program for controlling the sound box stored in the memory 1005 and further perform the following operations:

obtaining second sensing data detected by the second sensor; and determining the target channel information according to the first sensing data and the second sensing data.

Further, the processor 1001 can call the program for controlling the sound box stored in the memory 1005 and further perform the following operations:

when the first sensor corresponding to the first sensing data is located on a left side of the sound box, and the second sensor corresponding to the second sensing data is located on a front side of the sound box, determining that the target channel information is right channel information;

when the first sensor corresponding to the first sensing data is located on the left side of the sound box, and the second sensor corresponding to the second sensing data is located on a rear side of the sound box, determining that the target channel information is left channel information;

when the first sensor corresponding to the first sensing data is located on a right side of the sound box, and the second sensor corresponding to the second sensing data is located on the front side of the sound box, determining that the target channel information is left channel information;

when the first sensor corresponding to the first sensing data is located on the right side of the sound box, and the second sensor corresponding to the second sensing data is located on the rear side of the sound box, determining that the target channel information is right channel information.

Further, the processor 1001 can call the program for controlling the sound box stored in the memory 1005 and further perform the following operations:

obtaining a connection mode of the sound box and the other sound boxes when the sound box is in contact connection with the other sound boxes;

determining the target channel information of the sound box according to the connection mode; and outputting the audio according to the target channel information.

Further, the processor 1001 can call the program for controlling the sound box stored in the memory 1005 and further perform the following operations:

when the sound box is connected to the interface of other sound boxes through the contact, determining that the target channel information is right channel information;

when the sound box is connected to the contact of other sound boxes through the interface, determining that the target channel information is left channel information.

Further, the processor 1001 can call the program for controlling the sound box stored in the memory 1005 and further perform the following operations:

disconnecting a wireless communication connection between the sound box and the other sound boxes.

The present disclosure provides a method for controlling a sound box, a sound box and a computer readable storage medium.

First Embodiment

Figure 2:
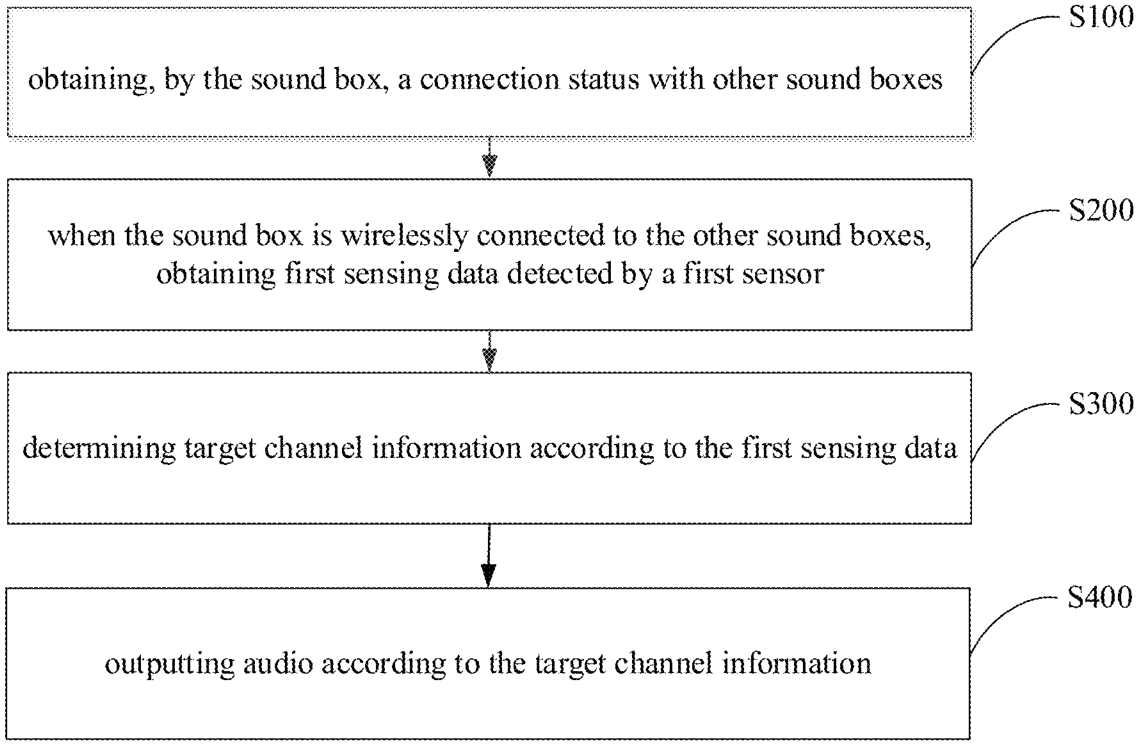
FIG. 2 is a schematic flowchart of a method for controlling a sound box according to an embodiment of the present disclosure.

As shown in FIG. 2, the method for controlling the sound box is applied to the sound box in a sound box system, the sound box system includes at least two sound boxes, each sound box includes at least two first sensors, the at least two first sensors are provided on opposite sides of the sound box, each first sensor is configured to transmit and receive preset signals, and the method includes following operations:

S100, obtaining, by the sound box, a connection status with other sound boxes.

When the sound box system includes multiple sound boxes, the connection between the sound box and other sound boxes may include contact connection and wireless communication connection. When the sound box is in contact with other sound boxes, the sound box and other sound boxes are in contact connection. When the sound box and other sound boxes are separated from each other, the sound box and other sound boxes are connected in wireless communication.

In a specific embodiment, the sound box includes a connecting portion, and the sound box can be contact-connected with other sound boxes through the connecting portion.

In another embodiment, the sound box and other sound boxes are connected through a wireless communication unit. Further, the wireless communication connection between the sound box and other sound boxes may be Bluetooth connection.

S200, when the sound box is wirelessly connected to the other sound boxes, obtaining first sensing data detected by a first sensor.

S300, determining target channel information according to the first sensing data.

When the sound box is separated from other sound boxes, the sound box is wirelessly connected to other sound boxes in the sound box system, and the first sensor of the sound box can send and receive preset signals with other sound boxes, thereby determining the relative positions of different sound boxes in the sound box system. After the first sensor of the sound box receives the first sensing data sent by other sound boxes, the target channel information of the sound box and the other sound boxes can be determined according to the first sensing data.

S400, outputting audio according to the target channel information.

The target channel information includes left channel information and right channel information. After the sound box determines the target channel information, the sound box outputs audio of a corresponding channel according to the target channel information.

In technical solutions of the present disclosure, the method for controlling the sound box is applied to the sound box in the sound box system. The sound box system includes at least two sound boxes, each sound box includes at least two first sensors, the at least two first sensors are provided on opposite sides of the sound box, and each first sensor is configured to transmit and receive preset signals. The method includes following operations: obtaining, by the sound box, a connection status with other sound boxes; obtaining first sensing data detected by the first sensor when the sound box is wirelessly connected to the other sound boxes; determining target channel information according to the first sensing data; and outputting audio according to the target channel information. When the user moves relative to the combined sound box, the target channel information is determined through the sound box. Therefore, the audio is output through the target channel information, thereby solving the problem that the sound box cannot be flexibly adjusted according to the current position of the user when the user moves in the related art.

Second Embodiment

Figure 3:
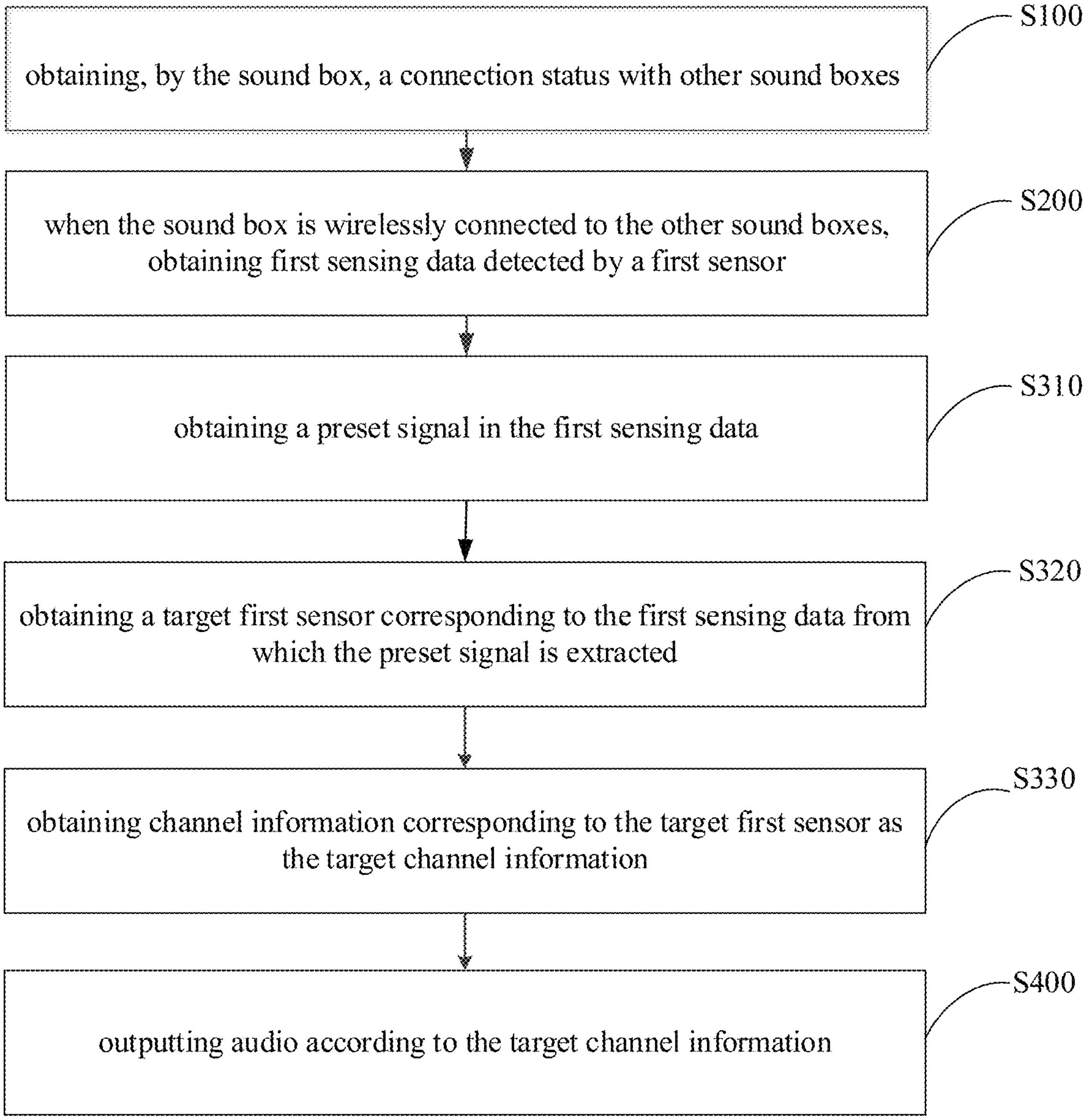
FIG. 3 is a schematic flowchart of the method for controlling the sound box according to another embodiment of the present disclosure.

As shown in FIG. 3, in the first embodiment, operation S300 includes:

S310, obtaining a preset signal in the first sensing data;

S320, obtaining a target first sensor corresponding to the first sensing data from which the preset signal is extracted; and S330, obtaining channel information corresponding to the target first sensor as the target channel information.

The preset signal refers to information received by the first sensor for detecting other sound boxes. Specifically, after determining the target first sensor corresponding to the first sensing data, the positional relationship between the sound box and other sound boxes may be determined according to the target first sensor, thus the target channel information of the sound box in the sound box system is determined. In a specific embodiment, the first sensor is an infrared transceiver module, and the infrared transceiver modules are provided on both sides of the sound box. The two sides of each of other sound boxes in the sound box system are also provided with the infrared transceiver modules. When the sound box is close to other sound boxes, the infrared transceiver modules of the sound box can communicate with the infrared transceiver modules of other sound boxes. When the infrared transceiver module on the right side of the sound box receives the preset signal of other sound boxes, it indicates that the sound box is located on the left side of other sound boxes, thereby determining the target channel information of the sound box.

Third Embodiment

Figure 4:
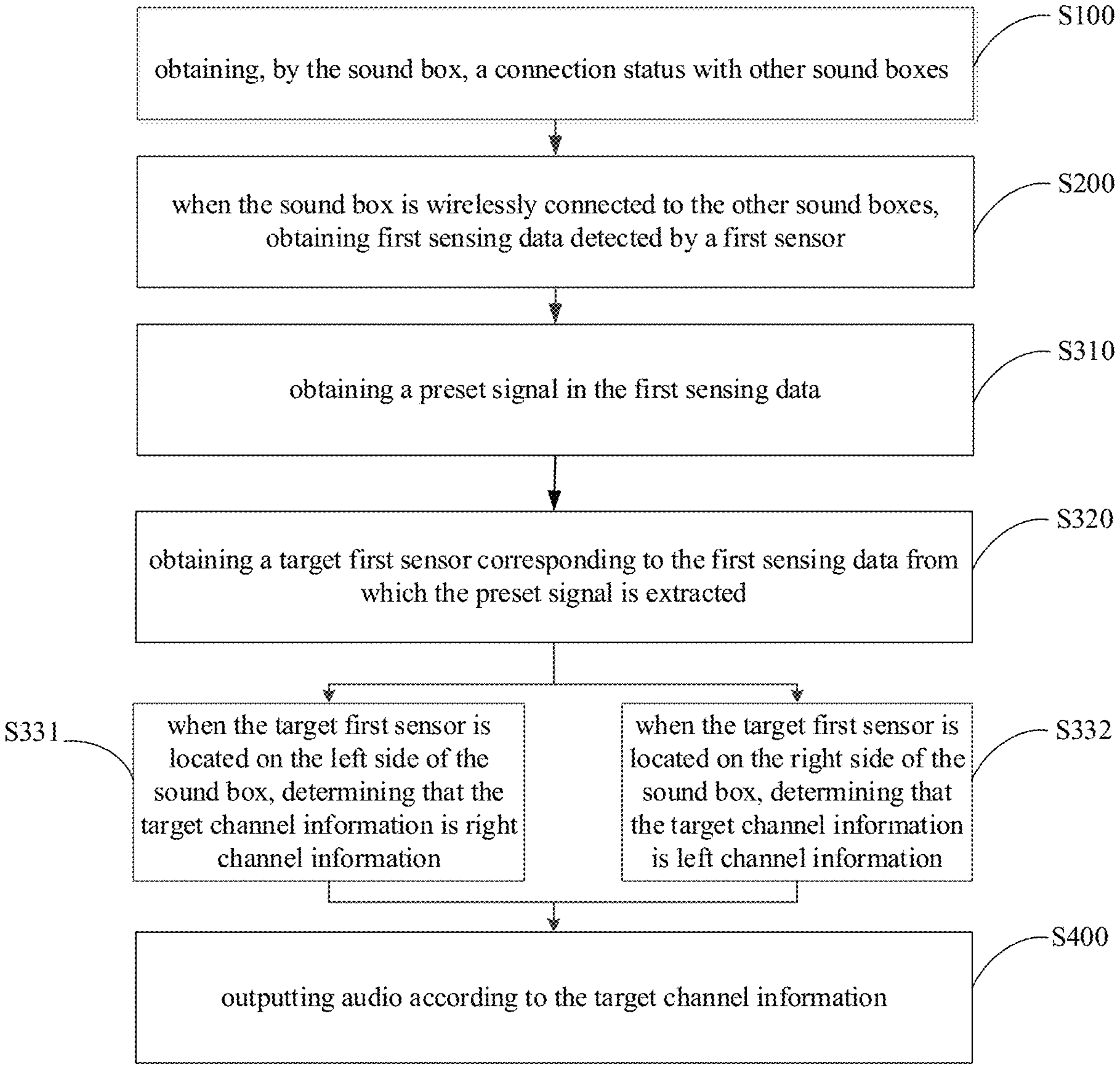
FIG. 4 is a schematic flowchart of the method for controlling the sound box according to still another embodiment of the present disclosure.

As shown in FIG. 4, in the second embodiment, operation S330 includes:

S331, when the target first sensor is located on the left side of the sound box, determining that the target channel information is right channel information;

S332, when the target first sensor is located on the right side of the sound box, determining that the target channel information is left channel information.

In a specific embodiment, when the first sensor located on the left side of the sound box is the target first sensor, it means that the sound box is located on the right side of other sound boxes, therefore, it is determined that the target channel information of the sound box is right channel information. When the first sensor located on the right side of the sound box is the target first sensor, it means that the sound box is located on the left side of other sound boxes, therefore, it is determined that the target channel information of the sound box is left channel information.

Fourth Embodiment

Figure 5:
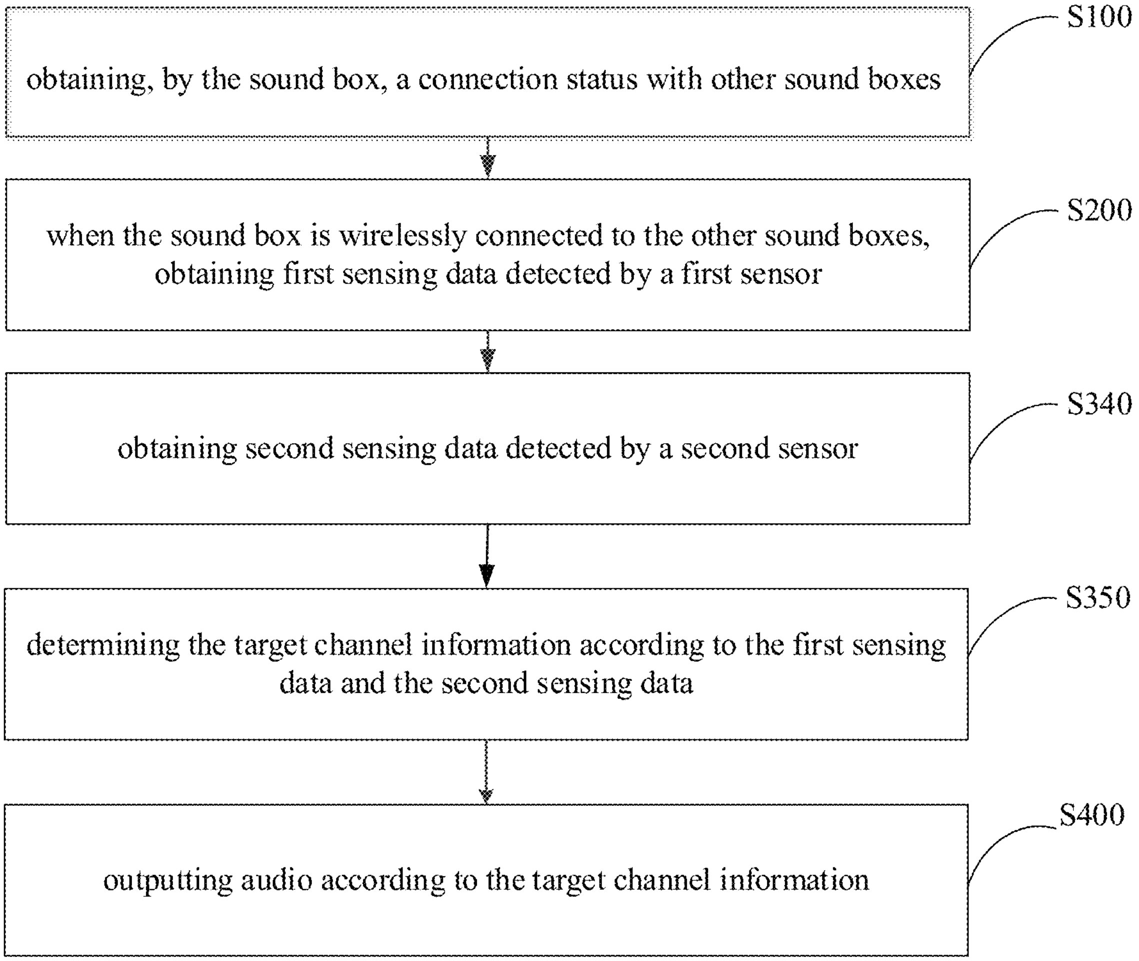
FIG. 5 is a schematic flowchart of the method for controlling the sound box according to still another embodiment of the present disclosure.

As shown in FIG. 5, in the first embodiment, the sensor of the sound box includes at least two first sensors and two second sensors. The two first sensors are opposite to each other, and the two second sensors are opposite to each other. The second sensors are between the first sensors. Specifically, the first sensors are configured to communicate with other sound boxes in the sound box system, and the second sensors are configured to detect human body signals. In an embodiment, the two first sensors are provided on the left and right sides of the sound box, and the two second sensors are provided on the front and back sides of the sound box. The detection range of each first sensor is 180 degrees, and the detection areas of the two first sensors do not overlap with each other. The detection range of each second sensor is 180 degrees, and the detection areas of the two second sensors do not overlap with each other. Operation S300 includes:

- S340, obtaining second sensing data detected by a second sensor; and
- S350, determining the target channel information according to the first sensing data and the second sensing data.

After receiving the first sensing data, the human body signal of the user detected by a second sensor is continued to be obtained. When the user uses the sound box, the position of the sound box does not change frequently, but the user may often move, which changes the relative position between the user and the sound box. In order to facilitate the user to accurately obtain the audio of the correct channel during the movement, after determining the relative position of the sound box to other sound boxes, the target channel information is determined according to the position with the user. Specifically, the user is detected by the second sensor. When the sound box determines the position with other sound boxes through the first sensor and the position with the user through the second sensor, the channel information of the sound box can be determined according to the first sensor and the second sensor.

Fifth Embodiment

Figure 6:
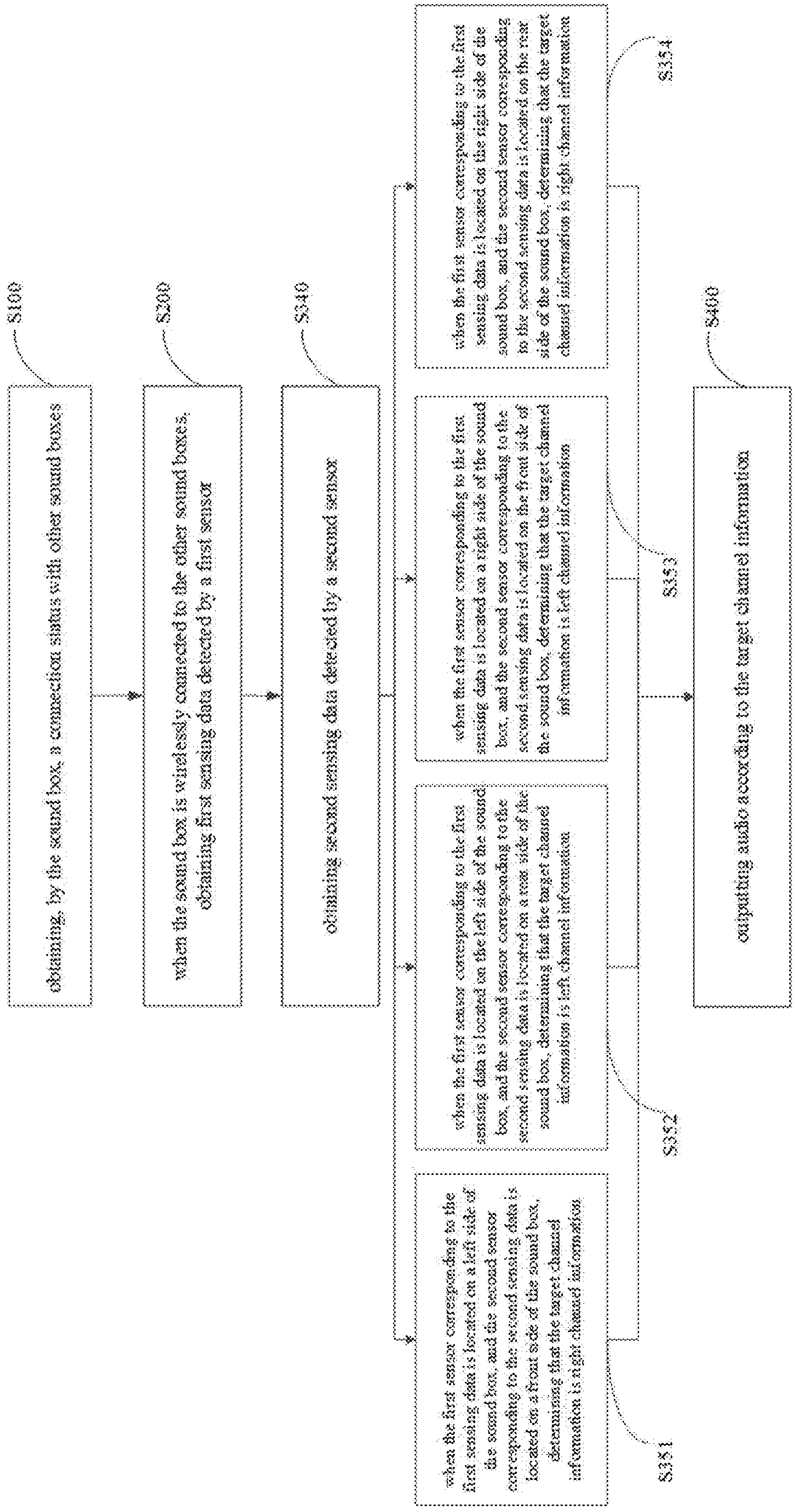
FIG. 6 is a schematic flowchart of the method for controlling the sound box according to still another embodiment of the present disclosure.

As shown in FIG. 6, in a specific embodiment, operation S350 includes:

- S351, when the first sensor corresponding to the first sensing data is located on a left side of the sound box, and the second sensor corresponding to the second sensing data is located on a front side of the sound box, determining that the target channel information is right channel information;
- S352, when the first sensor corresponding to the first sensing data is located on the left side of the sound box, and the second sensor corresponding to the second sensing data is located on a rear side of the sound box, determining that the target channel information is left channel information;
- S353, when the first sensor corresponding to the first sensing data is located on a right side of the sound box, and the second sensor corresponding to the second sensing data is located on the front side of the sound box, determining that the target channel information is left channel information;
- S354, when the first sensor corresponding to the first sensing data is located on the right side of the sound box, and the second sensor corresponding to the second sensing data is located on the rear side of the sound box, determining that the target channel information is right channel information.

Figure 7:
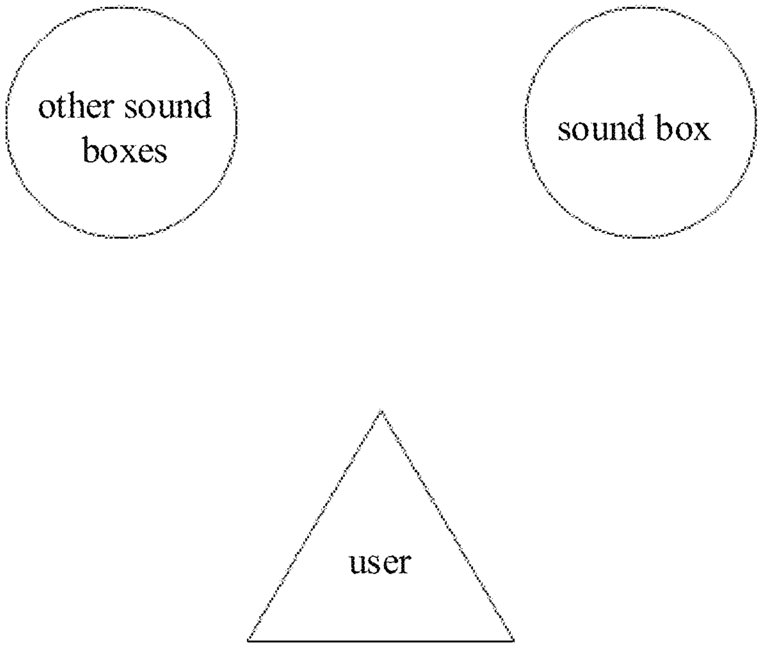
FIG. 7 is a schematic structural diagram of the method for controlling the sound box according to still another embodiment of the present disclosure.
Figure 8:
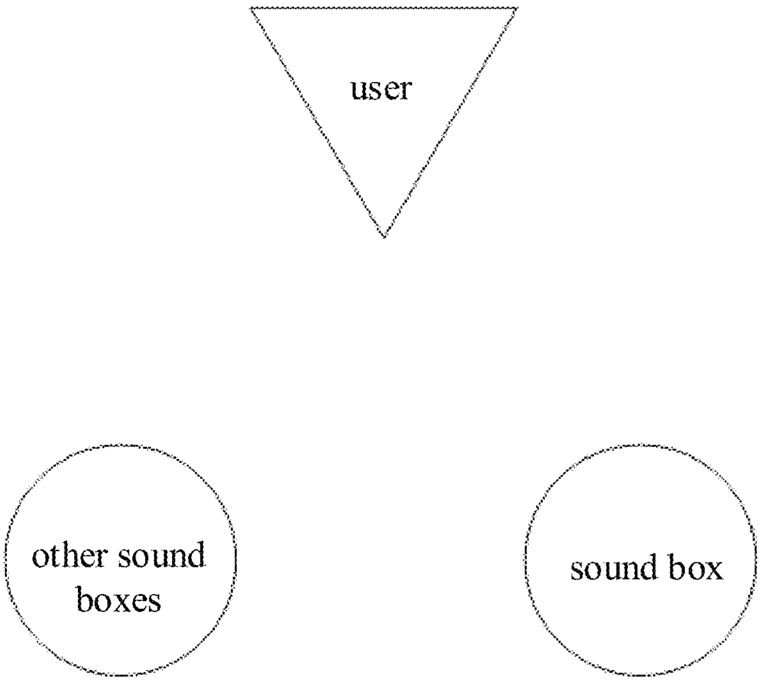
FIG. 8 is a schematic structural diagram of the method for controlling the sound box according to still another embodiment of the present disclosure.
Figure 9:
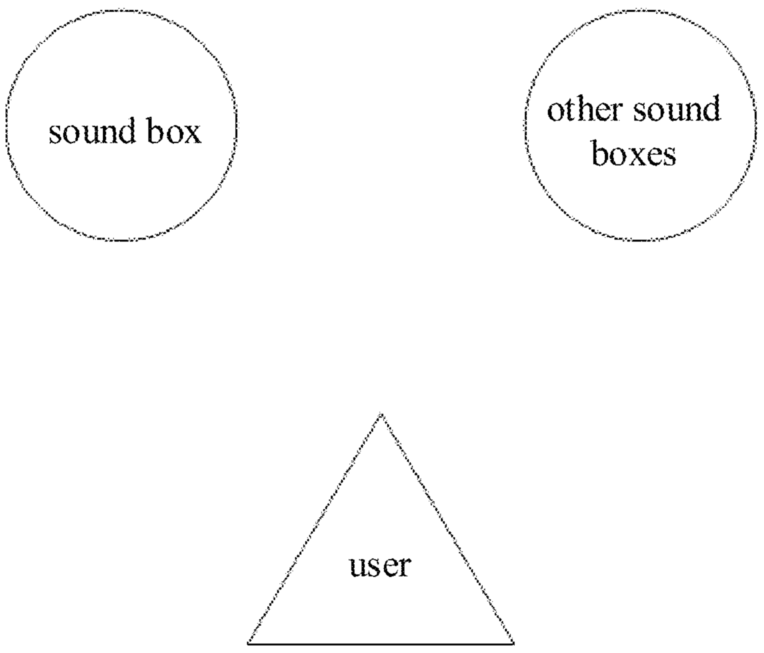
FIG. 9 is a schematic structural diagram of the method for controlling the sound box according to still another embodiment of the present disclosure.
Figure 10:
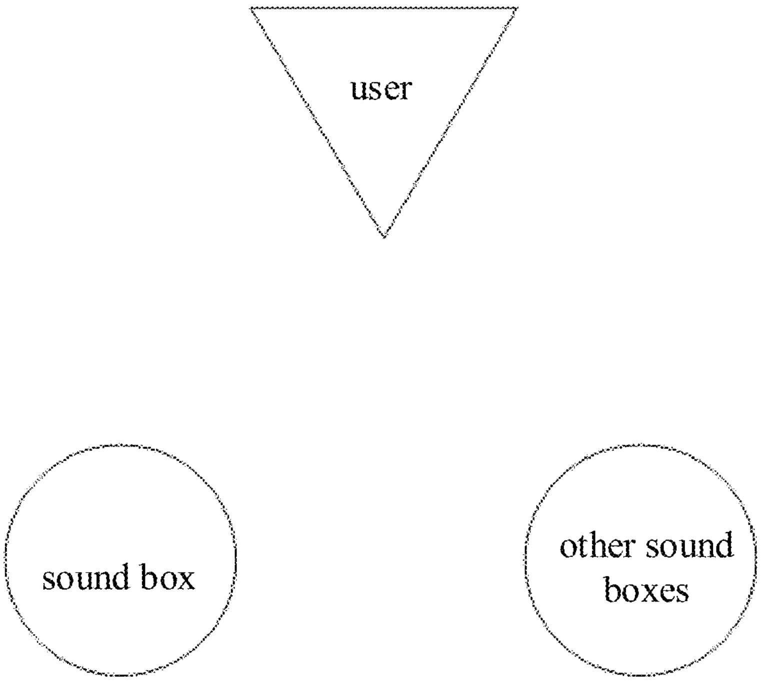
FIG. 10 is a schematic structural diagram of the method for controlling the sound box according to still another embodiment of the present disclosure.

Specially, as shown in FIG. 7, when the first sensor corresponding to the first sensing data is located on the left side of the sound box, it means that the sound box is on the right side of other sound boxes. When the second sensor corresponding to the second sensing data is located on the front side of the sound box, it means that the user is located on the front side of the sound box, so it is determined that the sound box should output right channel information. Similarly, as shown in FIG. 8, when the sound box is located on the right side of other sound boxes, and the second sensor corresponding to the second sensing data is located on the back side of the sound box, it means that the sound box is located on the relatively left side of the user, and the sound box should output left channel information. It is understandable that, as shown in FIG. 9 and FIG. 10, when the sound box is on the left side of other sound boxes, the sound box can determine the target channel information according to the second sensing data.

Sixth Embodiment

Figure 11:
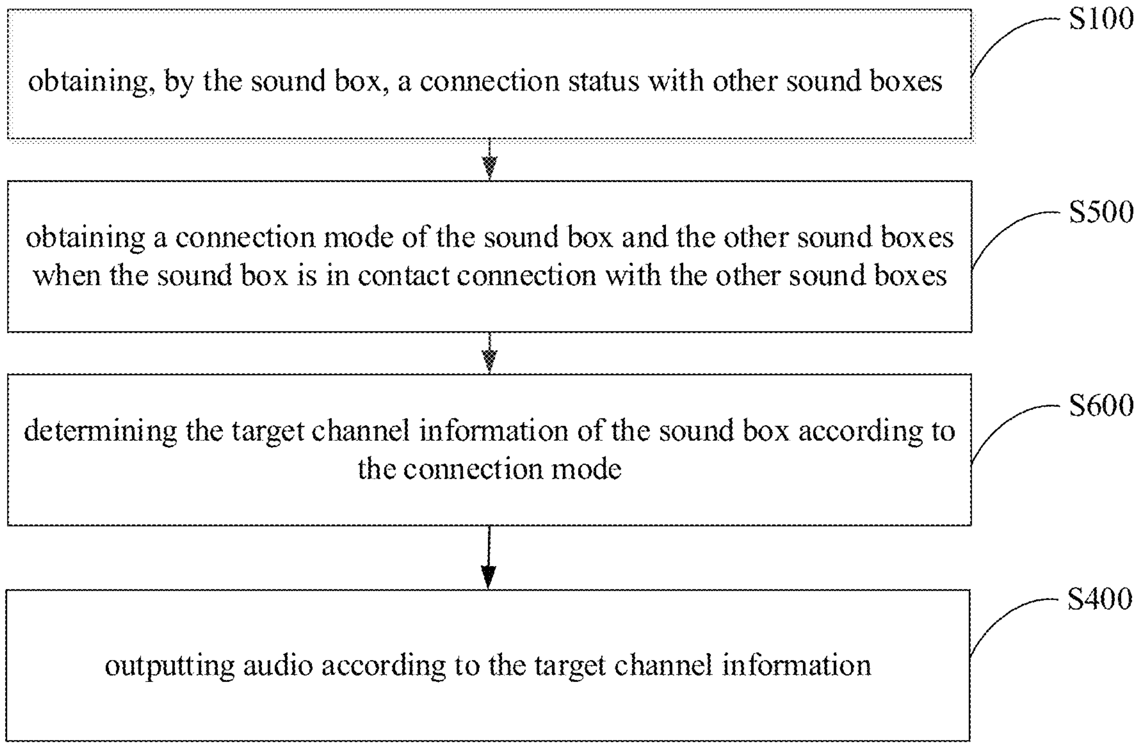
FIG. 11 is a schematic flowchart of the method for controlling the sound box according to still another embodiment of the present disclosure.

As shown in FIG. 11, in an embodiment, the sound box includes a contact and an interface, after the operation S100, the method further includes:

- S500, obtaining a connection mode of the sound box and the other sound boxes when the sound box is in contact connection with the other sound boxes;
- S600, determining the target channel information of the sound box according to the connection mode; and
- S400, outputting the audio according to the target channel information.

When the sound box and other sound boxes are in contact connection, the channel type of the audio output from the sound box and the other sound boxes can be determined according to the connection mode of the sound box and the other sound boxes.

In a specific embodiment, the sound box includes a first contact and a first interface, and other sound boxes include a second contact and a second interface. The first contact and the second contact have similar shapes, and the first interface and the second interface have similar shapes. The first contact can be fitted to the second interface, and the second contact can be fitted to the first interface. When the contact of the sound box is in contact with the interface, data can be transmitted through the contact and the interface, so as to transmit audio signals. When the combined sound boxes include a plurality of the sound boxes and a plurality of the other sound boxes, the plurality of the sound boxes and a plurality of the other sound boxes can be connected to each other. It is understandable that the contact connection mode between the sound box and other sound boxes is not limited to the connection through contacts. In another embodiment, the sound box can be snap-connected to other sound boxes, and when the sound box is snap-connected to other sound boxes, the connection mode of the sound box and the other sound boxes can be determined through the connecting portion, so as to determine the channel type of audio output from the sound box and the other sound boxes according to the connection mode.

Seventh Embodiment

Figure 12:
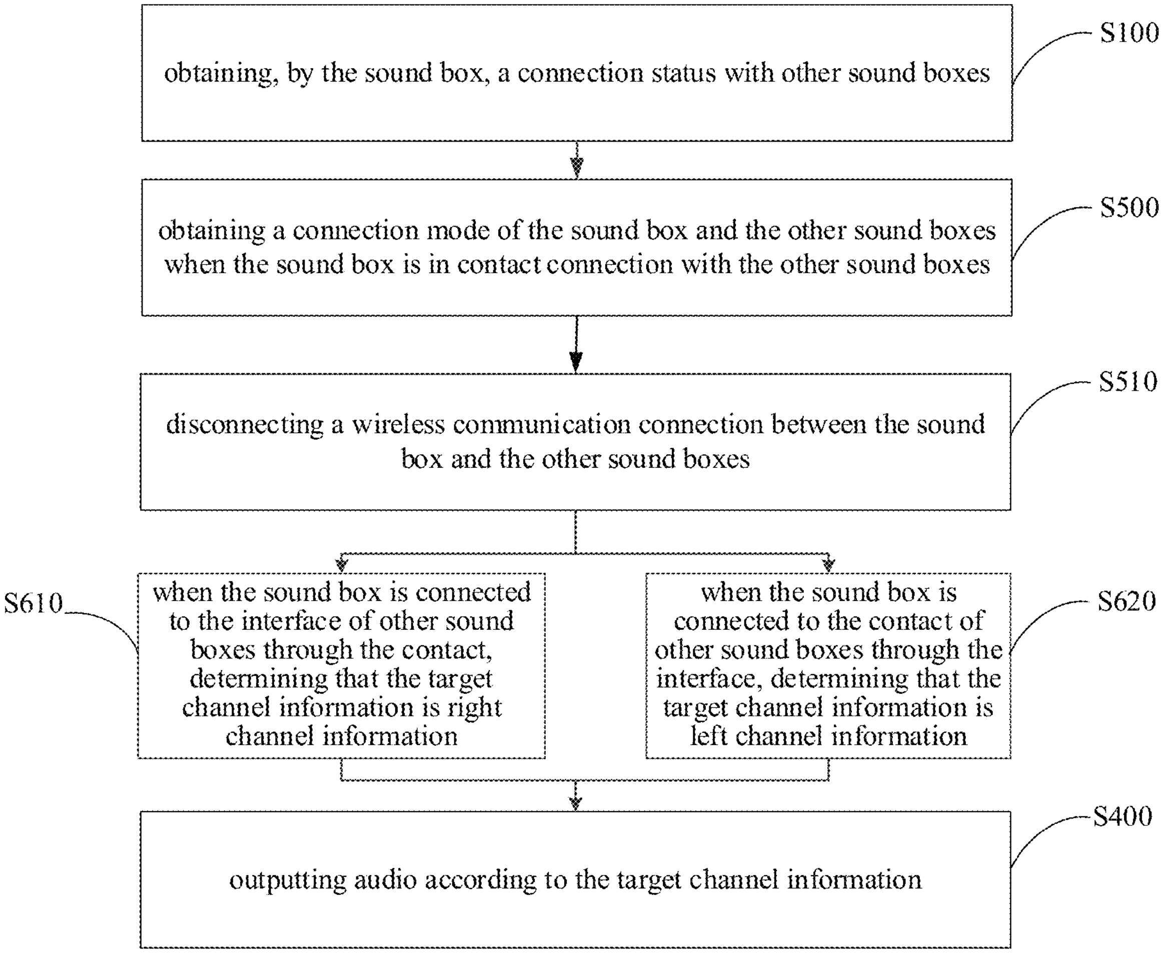
FIG. 12 is a schematic flowchart of the method for controlling the sound box according to still another embodiment of the present disclosure.

As shown in FIG. 12, in above embodiment, operation S600 includes:

- S610, when the sound box is connected to the interface of other sound boxes through the contact, determining that the target channel information is right channel information;

S620, when the sound box is connected to the contact of other sound boxes through the interface, determining that the target channel information is left channel information.

In a specific embodiment, the first contact of the sound box is located on the top of the sound box, and the first interface is located on the bottom of the sound box. The second contact of the other sound boxes is located on the top of the other sound boxes, and the second interface is located on the bottom of the other sound boxes.

When the first contact of the sound box is connected to the second interface of other sound boxes, it indicates that the other sound boxes are located on the top of the sound box. When the sound box is in contact with other sound boxes, the combined sound box can control the sound box at the top of the combined sound box to play the left channel information, and control the sound box at the bottom of the combined sound box to play the right channel information. Therefore, when the first contact of the sound box is connected to the second interface of other sound boxes, the sound box outputs right channel information, and other sound boxes output left channel information. When the first interface of the sound box is connected to the second contact of other sound boxes, the sound box outputs left channel information, and other sound boxes output right channel information.

In an embodiment, after operation S500, the method further includes:

S510, disconnecting a wireless communication connection between the sound box and the other sound boxes.

In order to avoid conflicts between the contact connection mode and the wireless connection mode of the sound box and other sound boxes, when the sound box is in contact with other sound boxes, the wireless connection between the sound box and the other sound boxes is disconnected, which ensures that the sound box and other sound boxes can transmit audio signals through contact connections, thereby reducing signal crosstalk between the sound box and the other sound boxes.

In order to achieve the above objective, the present disclosure provides a sound box, including a memory, a processor, a computer program stored in the memory and executed by the processor, the computer program, when executed by the processor, implements the operations of the method for controlling the sound box of any one of the embodiments as described above.

In a specific embodiment, the sound box includes a first control unit, a left channel control circuit, a right channel control circuit, a first left speaker, and a first right speaker. The first control unit is electrically connected to the left channel control circuit and the right channel control circuit. The left channel control circuit is electrically connected to the right channel control circuit. The left channel control circuit is electrically connected to the first left speaker. The right channel control circuit is electrically connected with the first right channel.

When the sound box receives the first channel information and determines that the first channel information is left channel information, the first control unit controls the left channel information to be sent to the left channel control circuit, and controls the left channel information to be sent from the left channel control circuit to the right channel control circuit. The left channel information is respectively sent to the first left speaker through the left channel control circuit and to the first right speaker through the right channel control circuit, therefore, both the first left speaker and the first right speaker of the sound box output left channel information.

In order to achieve the above objective, the present disclosure provides a non-transitory computer readable storage medium, and a program for controlling a sound box is stored in the non-transitory computer readable storage medium, the program for controlling the sound box, when executed by a processor, implements the operations of the method for controlling the sound box of any one of the embodiments as described above.

In an embodiment, the processor can be a central processing unit (CPU), or another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor can be a microprocessor or any conventional processor or the like.

The memory can be an internal storage unit of the device, such as a hard disk or memory of the device. The memory can also be an external storage device of the device, such as a plug-in hard disk, a smart media card (SMC), a secure digital (SD) card, a flash card equipped on the device. Further, the memory can also include both an internal storage unit of the device and an external storage device. The memory is configured to store the computer program and other programs and data required by the device. The memory can also be configured to temporarily store data that has been output or will be output.

Those skilled in the art can clearly understand that, for the convenience and conciseness of description, only the division of the above-mentioned functional units and modules is used for illustration. In practical applications, the above-mentioned function allocation can be completed by different functional units and modules as required, that is, the internal structure of the device is divided into different functional units or modules to complete all or part of the functions described above. The functional units and modules in the embodiments can be integrated into one processing unit, or each unit can exist alone physically, or two or more units can be integrated into one unit. The above-mentioned integrated unit can be implemented in the form of hardware or software functional unit. In addition, the specific names of the functional units and modules are only for the convenience of distinguishing each other, and are not used to limit the protection scope of the present disclosure. For the specific working process of the units and modules in the foregoing system, reference may be made to the corresponding process in the foregoing method embodiment, which will not be repeated here.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A method for controlling a sound box, applied to the sound box in a sound box system, wherein the sound box system comprises at least two sound boxes, each sound box comprises at least two first sensors, the at least two first sensors are provided on opposite sides of the sound box, each first sensor is configured to transmit and receive preset signals, the sound box comprises a contact and an interface, and the method comprises following operations:

obtaining, by the sound box, a connection status with other sound boxes;

when the sound box is wirelessly connected to the other sound boxes, obtaining first sensing data detected by a first sensor;

determining target channel information according to the first sensing data;

obtaining a connection mode of the sound box and the other sound boxes when the sound box is in contact connection with the other sound boxes, wherein the connection mode comprises that the contact is connected to the interface, the connection mode further comprises that the interface is connected to the contact, and both the contact and the interface are configured to transmit an audio signal;

determining the target channel information of the sound box according to the connection mode; and outputting audio according to the target channel information, wherein the operation of determining the target channel information of the sound box according to the connection mode comprises:

when the sound box is connected to an interface of other sound boxes through the contact, determining that the target channel information is right channel information, outputting, by the sound box, right channel information, and outputting, by other sound boxes, left channel information;

when the sound box is connected to a contact of other sound boxes through the interface, determining that the target channel information is left channel information, outputting, by the sound box, left channel information, and outputting, by other sound boxes, right channel information, and after the operation of obtaining a connection mode of the sound box and the other sound boxes when the sound box is in contact connection with the other sound boxes, the method further comprises:

disconnecting a wireless communication connection between the sound box and the other sound boxes, wherein the sound box further comprises at least two second sensors, the at least two second sensors are provided on opposite sides of the sound box, each second sensor is located between the at least two first sensors, and each second sensor is configured to detect a human body signal, the operation of determining target channel information according to the first sensing data comprises:

obtaining second sensing data detected by a second sensor; and determining the target channel information according to the first sensing data and the second sensing data.

2. The method of claim 1, wherein the method further comprises:

obtaining a preset signal in the first sensing data, wherein the preset signal refers to information received by the first sensor for detecting the other sound boxes;

obtaining a target first sensor corresponding to the first sensing data from which the preset signal is extracted.

3. The method of claim 2, wherein the at least two first sensors are provided on left and right sides of the sound box, the operation of obtaining channel information corresponding to the target first sensor as the target channel information comprises:

when the target first sensor is located on the left side of the sound box, determining that the target channel information is right channel information;

when the target first sensor is located on the right side of the sound box, determining that the target channel information is left channel information.

4. The method of claim 1, wherein the operation of determining the target channel information according to the first sensing data and the second sensing data comprises:

when the target first sensor corresponding to the first sensing data is located on a left side of the sound box, and the second sensor corresponding to the second sensing data is located on a front side of the sound box, determining that the target channel information is right channel information;

when the target first sensor corresponding to the first sensing data is located on the left side of the sound box, and the second sensor corresponding to the second sensing data is located on a rear side of the sound box, determining that the target channel information is left channel information;

when the target first sensor corresponding to the first sensing data is located on a right side of the sound box, and the second sensor corresponding to the second sensing data is located on the front side of the sound box, determining that the target channel information is left channel information;

when the target first sensor corresponding to the first sensing data is located on the right side of the sound box, and the second sensor corresponding to the second sensing data is located on the rear side of the sound box, determining that the target channel information is right channel information.

5. A sound box, comprising: a memory, a processor, a computer program stored in the memory and executed by the processor, the computer program, when executed by the processor, implements the operations of the method for controlling the sound box of claim 1.

6. A non-transitory computer readable storage medium, wherein a program for controlling a sound box is stored in the non-transitory computer readable storage medium, the program for controlling the sound box, when executed by a processor, implements the operations of the method for controlling the sound box of claim 1.

* * * * *